US011500998B2

(12) United States Patent
Fischer et al.

(10) Patent No.: US 11,500,998 B2
(45) Date of Patent: Nov. 15, 2022

(54) MEASURING THE VULNERABILITY OF AI MODULES TO SPOOFING ATTEMPTS

(71) Applicant: Robert Bosch GmbH, Stuttgart (DE)

(72) Inventors: Volker Fischer, Leonberg (DE); Jan Hendrik Metzen, Boeblingen (DE)

(73) Assignee: Robert Bosch GmbH, Stuttgart (DE)

( * ) Notice: Subject to any disclaimer, the term of this patent is extended or adjusted under 35 U.S.C. 154(b) by 434 days.

(21) Appl. No.: 16/692,621

(22) Filed: Nov. 22, 2019

(65) Prior Publication Data

US 2020/0175176 A1   Jun. 4, 2020

(30) Foreign Application Priority Data

Nov. 30, 2018 (DE) .......................... 102018220711.9

(51) Int. Cl.
*G06F 21/57* (2013.01)
*G06K 9/62* (2022.01)
*G06N 20/00* (2019.01)

(52) U.S. Cl.
CPC ......... *G06F 21/577* (2013.01); *G06K 9/6267* (2013.01); *G06N 20/00* (2019.01)

(58) Field of Classification Search
CPC ..... G06F 21/577; G06N 20/00; G06K 9/6267
See application file for complete search history.

(56) References Cited

U.S. PATENT DOCUMENTS

| 7,441,429 | B1 * | 10/2008 | Nucci ................. H04L 63/1416 709/224 |
| 2013/0019140 | A1 * | 1/2013 | Rogers, Jr. ............ G06F 21/572 714/E11.032 |
| 2018/0300487 | A1 * | 10/2018 | Gupta .................... G06N 20/00 |
| 2019/0019058 | A1 * | 1/2019 | Woodbridge ........ G06N 3/0454 |

(Continued)

FOREIGN PATENT DOCUMENTS

DE   102018200724 A1   10/2018

OTHER PUBLICATIONS

Fawzi, et al.: "Robustness of classifiers: from adversarial to random noise", 30th Conference NIPS 2016, Advances in Neural Information Processing Systems, 29 (2016), pp. 1-9.

(Continued)

*Primary Examiner* — Jacob D Dascomb
(74) *Attorney, Agent, or Firm* — Norton Rose Fulbright US LLP; Gerard Messina

(57) ABSTRACT

A method is described for measuring the vulnerability of an AI module to spoofing attempts, including the classification and/or regression onto which the AI module maps the update data set is ascertained as an unperturbed result for a predefined data set in the input space E; at least one perturbation S having a dimensionality d<D is applied to the predefined data set so that at least one perturbed data set results in the input space E; the classification and/or regression onto which the AI module maps the perturbed data set is ascertained as the perturbed result; the deviation of the perturbed result from the unperturbed result is ascertained using pre- (Continued)

defined metrics; in response to the deviation satisfying a predefined criterion, it is determined that the AI module with regard to the predefined data set is vulnerable to spoofing attempts having a dimensionality d.

16 Claims, 6 Drawing Sheets

(56) References Cited

U.S. PATENT DOCUMENTS

2019/0260778 A1* 8/2019 Chen .................. H04L 63/1466

OTHER PUBLICATIONS

Fawzi, et al.: "The Robustness of Deep Networks: A geometrical perspective", IEEE Signal Processing Magazine, 34 (2017), pp. 50-62.
"Neuroevolution", Wikipedia, The Free Encyclopedia, Oct. 29, 2018, pp. 1-8, [acsessed Jul. 27, 2022].
Papernot, et al.: "Distillation as a Defense to Adversarial Perturbations Against Deep Neural Networks", 2016 IEEE Symposium on Security and Privacy, (2016), pp. 582-597, https://ieeexplore.ieee.org/abstracUdocumenU7546524.
Papernot, et al.: "The Limitations of Deep Learning in Adversarial Settings", 2016 IEEE European Symposium on Security and Privacy (EuroS&P), (2016), pp. 372-387. https://ieeexplore.ieee.org/abstracUdocumenU7467366.

* cited by examiner

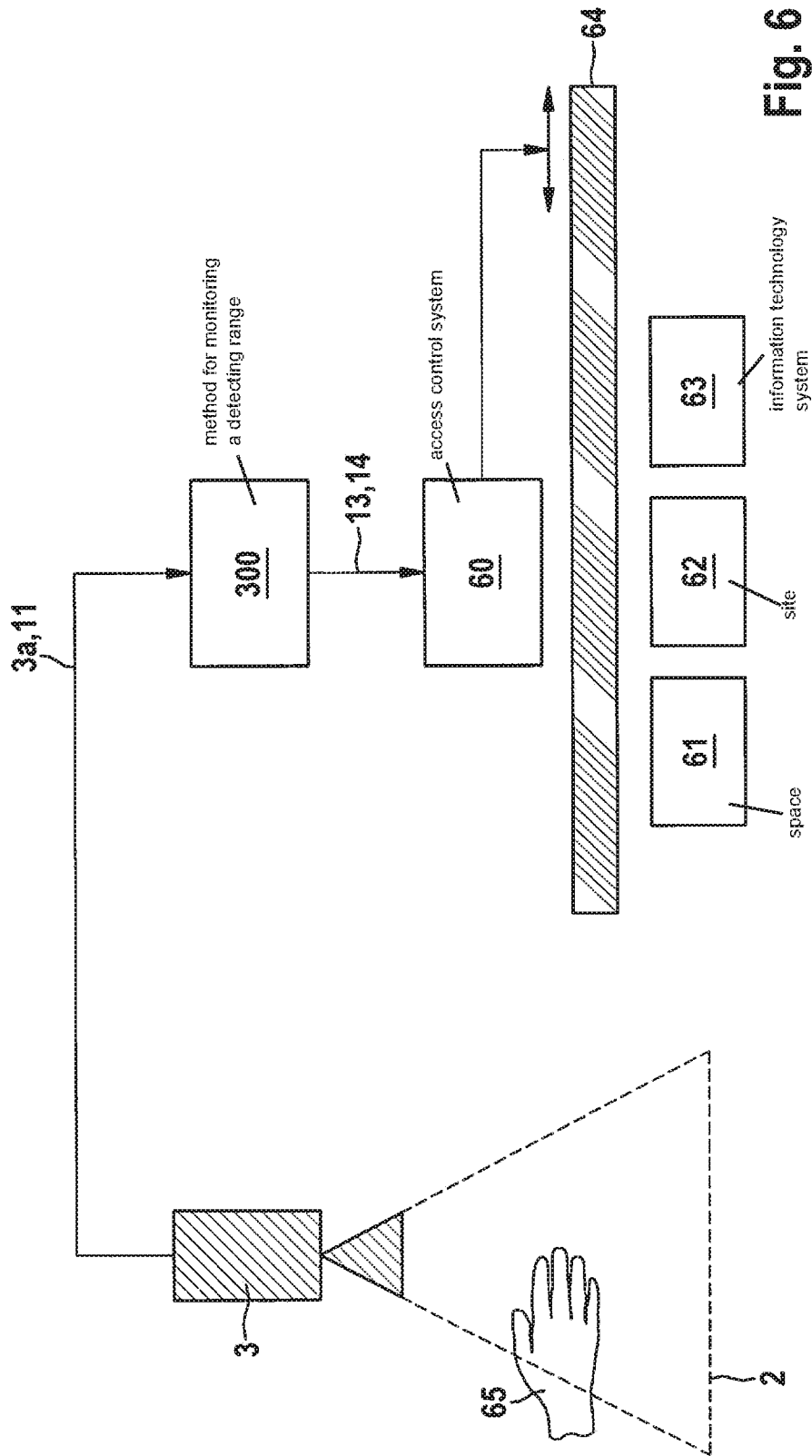

MEASURING THE VULNERABILITY OF AI MODULES TO SPOOFING ATTEMPTS

CROSS REFERENCE

The present application claims the benefit under 35 U.S.C. § 119 of German Patent Application No. DE 102018220711.9 filed on Nov. 30, 2018, which is expressly incorporated herein by reference in its entirety.

FIELD

The present invention relates to the securing of systems, which evaluate measuring data using AI modules, against spoofing attempts, in particular using so-called "adversarial examples".

BACKGROUND INFORMATION

AI modules that include teachable artificial intelligence, such as artificial neural networks, are used in many areas to evaluate measuring data. This is particularly advantageous when the measuring data, for example image data, are very high-dimensional, and a comparatively low-dimensional classification and/or regression are/is to be ascertained from them. For example, image data may be classified by AI modules with regard to which objects and traffic signs are contained in a road scene.

These types of AI modules may be attacked using so-called "adversarial examples". This involves changes to input data of the AI module that are introduced maliciously in a targeted manner with the aim of bringing about a classification into an incorrect class. Thus, for example, a traffic sign may be altered by adhesive stickers or markings, which are hardly noticed by a human driver, in such a way that it is recognized by the network as a different traffic sign. Consequently, the vehicle responds incorrectly to the traffic sign.

A method for generating data signal perturbations is described in German Patent Application No. DE 10 2018 200 724 A1, with which typical attacks of this type may be artificially reproduced. These reproductions may be used to study the vulnerability of the classification network and to test countermeasures.

SUMMARY

Within the scope of the present invention, an example method for measuring the vulnerability of an AI module to spoofing attempts is provided. The AI module includes trainable artificial intelligence in the form of a parameterized internal processing chain. The internal processing chain may in particular include an artificial neural network (ANN), for example. The parameters of the internal processing chain may then be weightings, for example, against which inputs that are applied to neurons are offset for activation of these neurons.

The AI module to be examined by use of the method is designed to map, with the aid of its internal processing chain, input data sets from an input space E having a dimensionality D onto a classification and/or regression in an output space F having a dimensionality $G<D$. The classification indicates, for example for an input data set and a predefined canon of classes, with which confidences the input data set belongs to each of these classes. The regression indicates, for example for an input data set and a real-valued variable of interest, which values of this variable are consistent with which confidences in light of the input data set.

$G<<D$ applies in most applications. Thus, for example, an image having a size of 512×512 pixels exists in an input space E having a dimensionality $D=262,144$. The number of different objects whose presence in the image is to be examined determines dimensionality G of output space F, and is typically less than 1000.

In the method, the classification and/or regression onto which the AI module maps the update data set are/is ascertained as an unperturbed result for a predefined (update) data set in input space E.

At least one perturbation S having a dimensionality $d<D$ is applied to the update data set. In this way, at least one perturbed data set results in input space E.

For this purpose, an "adversarial example" for the AI module may be ascertained as a perturbation S in a particularly advantageous manner. In particular for AI modules that include ANNs, algorithms are known via which "adversarial examples" having a freely selectable dimensionality d may be generated.

The classification and/or regression onto which the AI module maps the perturbed data set are/is ascertained as the perturbed result. The deviation of the perturbed result from the unperturbed result is ascertained using predefined metrics. These metrics may in particular be customized to the specific application in which the result that is delivered by the AI module, i.e., the classification and/or regression, is to be used. The impetus for the metrics may then be, for example, the extent to which the deviation creates a perturbation in the application.

When the AI module is used, for example, to recognize traffic signs in a scene within the scope of a driving assistance system or a system for fully automated or semi-automated driving, confusing a "speed limit 50" sign with a "speed limit 60" sign results in only a minor disruption of traffic. In contrast, if a "speed limit 50" sign is mistaken for a stop sign, abrupt braking of the vehicle may result and may cause a rear-end collision. Conversely, if the stop sign is mistaken for a "speed limit 50" sign, the potential consequences are more severe due to the fact that the vehicle may possibly be hit from the side by essentially unbraked vehicles having the right of way. In this application, the metrics may, for example, assess the deviation according to the severity of the possible effects in traffic.

When the AI module is used, for example, to decide in an access control system, based on measuring data, whether a valid access medium has been presented, in the final analysis it does not matter if one invalid access medium is confused with another; the access is still not granted. If two valid access media are confused with one another, this may have the effect, for example, that the access is granted with an incorrect authorization level, or that the incorrect person is noted in protocol files concerning access. If a valid access medium is mistaken for an invalid one, an authorized person is denied entry, which may disturb the operational procedures. In the worst case, an invalid access medium is mistaken for a valid one, and a completely unauthorized person is granted access.

The effect of a perturbation S on the result is determined by the interplay between the vulnerability of the AI module to perturbation S and the severity of this perturbation S. In order to measure the vulnerability of the AI module in a targeted manner, the metrics may, for example, indicate the effect per unit severity of perturbation S, or may be normalized to a unit severity S of the perturbation.

In response to the deviation satisfying a predefined criterion, it is determined that the AI module with regard to the update data set is vulnerable to spoofing attempts having a dimensionality d. For scalar metrics, for example, the criterion may include the exceedance or undershooting of a predefined threshold value.

It has been recognized that those perturbations S, in the context of the particular application, that have an appreciable effect on the result of the classification and/or regression exist in a subspace $C \subset E$ having a dimensionality $c<D$. If a perturbation S having a dimensionality smaller than c is now applied to an input data set, the probability is low that this perturbation S is present in C. If c=20, for example, and only one one-dimensional perturbation is applied, it is unlikely that the one-dimensional straight line corresponding to the perturbation intersects 20-dimensional subspace C that is present anywhere in input space E. In contrast, if perturbation S has a dimensionality of c or greater, the likelihood greatly increases that it is present in C. This is particularly true when "adversarial examples" are selected as perturbations S in a targeted manner.

Thus, perturbation S must have a certain minimum dimensionality in order to noticeably affect the result. It has been recognized that this minimum dimensionality is a reliable measure for how robust the AI module is against spoofing attempts. This may be illustrated using the example of images as input data sets. As explained above, dimensionality D of input space E corresponds to the number of image pixels. In this example, the minimum dimensionality at which a perturbation S begins to have a noticeable effect corresponds to the number of pixels that are influenced by perturbation S. For the maximum vulnerable negative example of an AI module, subspace $C \subset E$ is then one-dimensional. This means that a change in the image in only one pixel is sufficient to significantly change the classification and/or regression. In contrast, if subspace $C \subset E$ almost has dimensionality D, virtually all pixels of the image must be changed in order to spoof the AI module.

In turn, the greater the minimum dimensionality of a perturbation S must be, the more difficult it is to apply this perturbation to input data sets unnoticed. In the example of the stop sign mentioned at the outset, with a vulnerable AI module even an inconspicuous adhesive sticker on the sign may be sufficient to misclassify the sign. In contrast, in order to spoof a more robust AI module, the sign would have to be altered so greatly that the spoofing attempt would be obvious to the eye, and someone would attend to removing this alteration. For example, the classification result supplied even by such a robust AI module could be changed with absolute certainty by simply removing the stop sign and replacing it with another sign.

This means that the minimum dimensionality of a perturbation S that has a significant effect on the particular application, according to the predefined metrics, is a particularly appropriate measure for the vulnerability of the AI module to such perturbations, which may infiltrate the input data sets unnoticed.

Therefore, in one particularly advantageous embodiment, multiple perturbations S having different dimensionalities d are applied to the same update data set. For example, one may start with a low dimensionality d of perturbations S, for example d=1, and dimensionality d of perturbations S may then be increased in steps, for example by increments of 1 in each case. Smallest dimensionality c=min(d), for which a vulnerability of the AI module to spoofing attempts is determined according to the stated metrics, is evaluated as a measure for the vulnerability of the AI module with regard to the update data set. For example, for this purpose variable s=D−c may be selected as the "intrinsic dimension" of the perturbations having a great effect. The smaller the value of c, i.e., the greater the vulnerability, the greater the value of s.

Furthermore, it has been recognized that the vulnerability, measured by c or s, in input space E in which the input data sets exist is not homogeneously distributed. In particular, there may be input data sets for which the vulnerability of the AI module to spoofing attempts is particularly great (so-called "corner cases"). The situation is comparable, in a sense, to a mountain hiking trail which for the most part is walkable by inexperienced hikers, but which also has some exposed locations at which a misstep immediately results in a fall. The method allows such "corner cases" to be identified and quantified. In turn, countermeasures may thus be taken to reduce the vulnerability. For example, the AI module may be trained with additional learning data in areas around the "corner cases".

In another advantageous embodiment, the vulnerability of the AI module with regard to multiple data sets, for example measured in the form of c or s, is ascertained from a predefined set M.

Summary statistics are ascertained via the vulnerabilities ascertained in this way. These summary statistics may contain, for example, an average value and/or a variance and/or a frequency distribution and/or a worst case value of the ascertained vulnerabilities.

Thus, for example, for many applications it may be sufficient for the vulnerability on average to remain in a predefined framework, while in other applications in which there is a risk of property damage or personal injury in the event of a malfunction, a "worst-case" estimation of the vulnerability is required.

The newly obtained quantifiablity of the vulnerabilities of AI modules to spoofing attempts may be utilized in particular as feedback in order to harden AI modules against spoofing attempts.

Moreover, the present invention thus relates to a method for producing an AI module, which includes trainable artificial intelligence in the form of a parameterized internal processing chain, and which is designed to map, with the aid of this internal processing chain, input data sets from an input space E having a dimensionality D onto a classification and/or regression in an output space F having a dimensionality $G<D$.

In this method, the architecture of the internal processing chain is established by so-called hyperparameters. These hyperparameters relate to degrees of freedom that exist in the configuration of the architecture. For example, the architecture of an ANN includes the sequence of certain types of layers (for example, a folding layer and a max pooling layer $10x$ in alternation, followed by a fully interlinked layer) as well as the specific dimensions of these layers (such as 512×512 neurons in the input layer).

An AI module is formed which includes the internal processing chain, having an architecture according to the established hyperparameters. This architecture then includes parameters for the training that are still free—in the case of an ANN, for example the weightings against which inputs, supplied to each neuron, are offset for activation of this neuron. During training of the AI module, these free parameters are optimized, based on a set L of learning data sets and associated learning results, in such a way that the AI module with a predefined accuracy maps the learning data sets onto the learning results according to an error function. For example, the learning data sets may include images of road scenes, and the learning result associated with each image indicates which objects the AI module is to recognize in the image.

After completion of the training, summary statistics of the vulnerabilities of the trained AI module are ascertained, using a set M of validation data sets according to the above-described method. Set M of the validation data sets advantageously should be disjoint from set L of the learning data sets, since the learning data sets are characterized by the AI module being particularly optimized in particular for the correct processing of these data sets. However, in particular the correct functioning of the AI module in unknown situations is relevant for the application.

The hyperparameters, i.e., the architecture of the AI module, are/is now optimized in such a way that after the AI module is newly formed and trained, the summary statistics, ascertained for this purpose, of the vulnerabilities indicate an overall lesser vulnerability to spoofing attempts.

It has been recognized that the vulnerability of AI modules to spoofing attempts is determined not only by their particular training, but also by the underlying architecture. For the training, there is feedback in the form of the error function, which assesses how well the predefined learning results are reproduced. Due to the summary statistics of the dependencies, feedback with regard to the architecture of the AI module is also now available.

In one particularly advantageous embodiment, the hyperparameters are optimized by generating architectures of the internal processing chain, using an evolutionary algorithm. The summary statistics of the vulnerabilities, ascertained in each case after the AI module is newly formed and trained, using an architecture, are entered into a quality criterion for assessing this architecture.

Within the scope of the evolutionary algorithm, architectures of the internal processing chain may be modified, for example using the natural analog crossing and mutation method, in such a way that those architectures having the better quality criterion "survive" ("survival of the fittest"). An evolutionary algorithm is particularly suited for optimizing the architectures, since it does not require the hyperparameters that are to be optimized to be continuous. Thus, for example, the type of layer in an ANN (such as a folding layer, pooling layer, or fully interlinked layer) is a discrete variable, which, for a gradient descent method that is frequently used for optimization tasks, is difficult to comprehend.

In another particularly advantageous embodiment of the above-described method, at least one update data set and/or at least one learning data set contain(s) at least one measured value of a physical measured variable. In this way, a system that evaluates these measured variables is protected from the evaluation being steered unnoticed in the wrong direction due to a slight targeted manipulation of the measured variable. The measured value may be ascertained in particular via a sensor that records a physical effect whose type and/or severity are/is characterized by the physical measured variable.

Ascertaining the vulnerability of an AI module to spoofing attempts is generally not an end in itself, but, rather, is based on a specific application. It has been recognized that the stated vulnerability within the scope of such an application may be directly utilized as a measure for the reliability of results that are ascertained using the AI module. Depending on the application, a well-founded statement concerning the reliability may be just as important as the result itself.

Moreover, the present invention thus relates to a method for monitoring a detection range. In this method, at least one measuring data set with measuring data is detected by physical observation of the detection range, using at least one sensor.

The measuring data set is supplied to an AI module, which includes trainable artificial intelligence in the form of a parameterized internal processing chain and which is designed to map input data sets from an input space E having a dimensionality D onto a classification and/or regression in an output space F having a dimensionality $G<D$, with the aid of this internal processing chain. Input space E here is the space in which the possible measuring data may be moved. Output space F and its dimensionality G are the subject pursued via the monitoring, such as the type and number of objects to be classified in the measuring data.

The classification and/or regression that are/is output by the AI module are/is classified and/or output as the result of the monitoring. In addition, the vulnerability of the AI module to spoofing attempts is measured using the described method, and is classified and/or output as a measure for the reliability of the result.

The vulnerability of the AI module to spoofing attempts, ascertained in an automated manner, in turn opens up the possibility for taking countermeasures against such spoofing attempts in an automated manner, provided that the ascertained vulnerability satisfies a predefined criterion. For a scalar vulnerability, the criterion may involve, for example, a predefined threshold value being exceeded or undershot.

As an example of a possible countermeasure, the measuring data set may be supplied to a further AI module, this further AI module having a different architecture than the previously used AI module, and/or the further AI module having been trained differently than the previously used AI module. The more universally the same spoofing attempt (such as an "adversarial example") fits with differently trained, or even differently structured, AI modules, the more difficult it is to superimpose the manipulation on the measuring data in such a way that it is not otherwise noticed.

As another example of a possible countermeasure, additional measuring data may be detected using a further physical sensor. These additional measuring data may be used to check the result for plausibility. For example, a further physical sensor may be activated for this purpose. The spoofing attempt (such as the "adversarial example") exists in input space E of the AI module, but the additional measuring data exist outside this space E and are thus not affected by the spoofing attempt.

As a further example of a possible countermeasure, the result may be discarded. Depending on the application, this may be the "lesser evil" compared to further processing a possibly manipulated result.

According to the above discussion, in one particularly advantageous embodiment the detection range includes at least a portion of the surroundings of a vehicle. The result delivered by the AI module is supplied to a driving assistance system or system for at least partially automated driving, installed in the vehicle. The driving assistance system or system for at least partially automated driving is designed to control a steering system, a drive system, and/or a braking system of the vehicle, based on the result. On the one hand, this particular application is particularly critical to safety, and on the other hand, spoofing attempts are easily made, since traffic signs, for example, are publicly accessible.

Various specific countermeasures are meaningful, individually or in combination, for the application in the vehicle.

Thus, for example, a physical warning device that is noticeable to a driver of the vehicle may be activated. The driver of the vehicle may be prompted to confirm or correct the result delivered by the AI module, and/or to take control of the vehicle. In the highest escalation stage, the vehicle may be brought to a standstill on an emergency trajectory that is provided in the event of failure of the at least partially automated driving function.

As mentioned above, access control systems are another important application. For this reason, in another particularly advantageous embodiment the detection range includes at least a portion of an area in which an access control system for controlling the access to a space, a site, and/or an information technology system anticipates the provision of an access medium. The result delivered by the AI module is supplied to the access control system. The access control system is designed to decide, based on this result, whether a valid access medium is present in the detection range. Based on this decision, in particular a blocking device and/or alarm device may be actuated to grant or deny access. Attempts to pretend to be a valid access medium by a targeted manipulation of the measuring data may be hampered with the described countermeasures.

In addition, further specific countermeasures may be meaningful, individually or in combination, in particular for the access control. Thus, for example, additional authentication such as a PIN or a password may be demanded from a person requesting access. Access may also be blocked for a predetermined period, for example independently of the presence of a valid access medium, in order to thwart repeated spoofing attempts. In addition, for example an alarm may be output to an authority responsible for the security of the space, the site, or the information technology system.

In one particularly advantageous embodiment, biometric measuring data of a person requesting access are selected as measuring data. It is generally difficult or not possible at all to copy such an access medium, so that for an attacker it represents an alternative to be taken seriously, instead of spoofing the AI module.

According to the above discussion, the stated methods may make use of additional hardware such as additional sensors. However, this is not absolutely necessary. The methods may also be completely or partially implemented in software, which yields the direct customer benefit that the vulnerability of the AI module to spoofing attempts may be recognized, reduced, or mitigated with regard to the consequences for the particular application. Moreover, the present invention thus relates to a computer program, containing machine-readable instructions, which when executed on a computer and/or on a control unit and/or on an embedded system cause the computer and/or the control unit and/or the embedded system to carry out one of the described methods. Moreover, the present invention relates to a machine-readable data medium or a download product that contains the computer program.

Further measures that enhance the present invention, together with the description of the preferred exemplary embodiments of the present invention, are explained in greater detail below with reference to the figures.

BRIEF DESCRIPTION OF THE DRAWINGS

FIG. 6 shows a schematic illustration of an example of an application of method 300 in an access control system 60.

DETAILED DESCRIPTION OF EXAMPLE EMBODIMENTS

Figure 1:
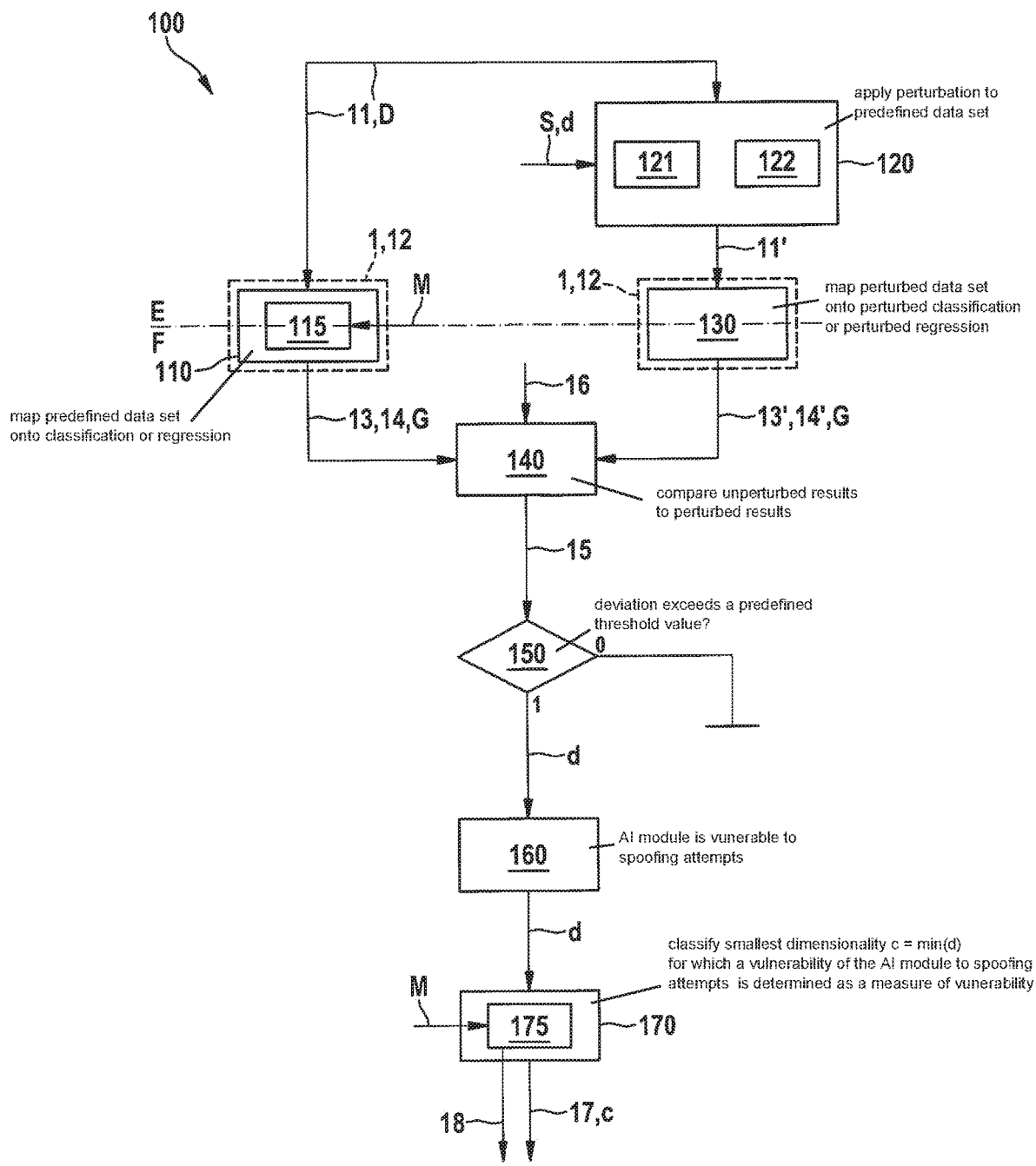
FIG. 1 shows one exemplary embodiment of method 100 for measuring the vulnerability.

FIG. 1 shows one exemplary embodiment of method 100. AI module 1 and its internal processing chain 12 map a predefined update data set 11 that exists in input space E, having a dimensionality D, onto a classification 13 and/or regression 14 in an output space F having a dimensionality G in step 110.

In addition, a perturbation S having a dimensionality d<D is applied to same update data set 11 in step 120. According to block 121, this may be an "adversarial example" for AI module 1 used. According to block 122, various perturbations S having different dimensionalities d may also be used. Perturbed data set 11' is mapped onto a perturbed classification 13' or onto a perturbed regression 14' in step 130.

Unperturbed result 13, 14 is compared to perturbed result 13', 14' in step 140, based on metrics 16. A check is made in step 150 as to whether ascertained deviation 15 satisfies a predefined criterion, i.e., whether it exceeds a predefined threshold value, for example. If this is the case (truth value 1), it is determined in step 160 that with regard to update data set 11, AI module 1 is vulnerable to spoofing attempts having a dimensionality d. The smallest dimensionality c=min(d) for which this is the case is classified in step 170 as a measure 17 for the vulnerability of AI module 1 with regard to update data set 11.

Optionally, according to block 115 the vulnerability of AI module 1 with regard to multiple data sets 11 may be ascertained from a predefined set M. According to block 175, summary statistics 18 may be generated via associated measures 17, c determined in step 170 in each case for the vulnerability of AI module 1.

Figure 2:
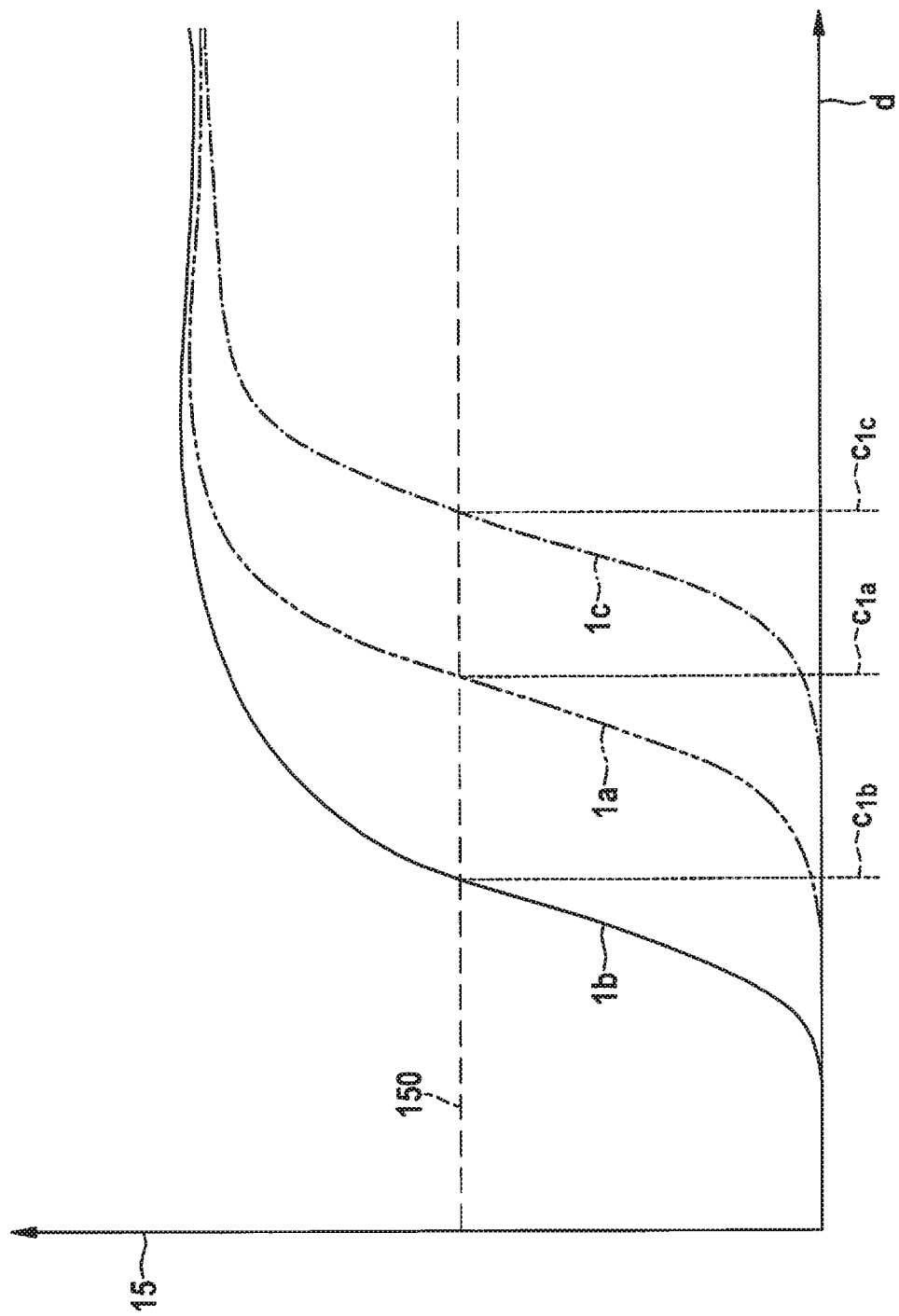
FIG. 2 shows a comparison of dimensionalities $c_{1a}$, $c_{1b}$, $c_{1c}$ of perturbations S, beginning at which significant deviations 15 are caused for AI modules 1a, 1b, 1c.

Deviations 15 that result when perturbations S of various dimensionalities are applied to the same update data set 11, and perturbed data set 11' is then processed in each case via an AI module 1a through 1c, are plotted in FIG. 2 for three AI modules 1a through 1c by way of example. Using a criterion 150 which in this example is implemented as a threshold value, a check is made in each case as to whether deviation 15 is significant with regard to the application in question. Smallest dimensionality d for which this is the case for each of the three examined AI modules 1a through 1c is denoted by reference symbol $c_{1a}$, $c_{1b}$, $c_{1c}$, respectively, in FIG. 2. The higher this dimensionality $C_{1a-1c}$, the greater the robustness of associated AI module 1a through 1c against spoofing attempts. In the example shown in FIG. 2, the truncation for AI module 1b is poorest, and that for AI module 1c is best. The vulnerability of AI module 1a is between the vulnerabilities of AI modules 1b and 1c, based on update data set 11 used for this examination.

Figure 3:
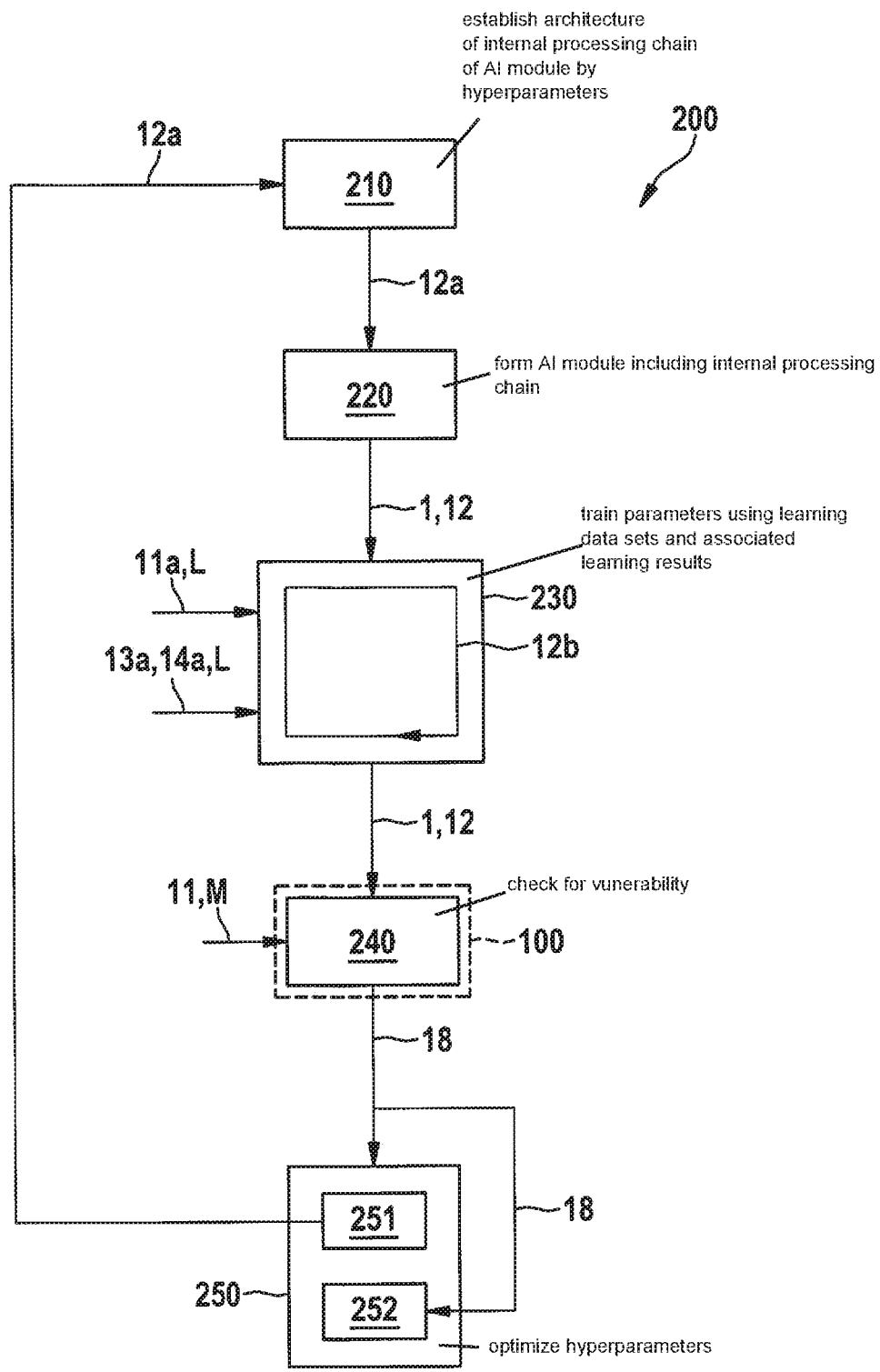
FIG. 3 shows one exemplary embodiment of method 200 for producing an AI module 1.

FIG. 3 shows one exemplary embodiment of method 200 for producing an AI module 1. The architecture of internal processing chain 12 of AI module 1 is established by hyperparameters 12a in step 210. As described above, these hyperparameters 12a do not have to be just numerical values. Rather, hyperparameters 12a may also include, for example, selection options as to whether a layer of an ANN is a folding layer, a fully interlinked layer, or a pooling layer, for example.

AI module 1 including internal processing chain 12, having the architecture that is established by hyperparameters 12a, is formed in step 220. This architecture is an approach that uses parameters 12b that are still free, such as the weightings in the ANN. These parameters 12b are trained in step 230, using learning data sets 11a from a set L and associated learning results 13a, 14a. This means that parameters 12b are varied until learning data sets 11a are mapped onto learning results 13a, 14a with a predefined accuracy, according to an error function.

Completely trained AI module 1 is checked for its vulnerability to spoofing attempts in step 240 according to above-described method 100. For this purpose, validation data sets from a set M are used as update data sets. Summary statistics 18 of the particular vulnerabilities of AI module 1 are created across all validation data sets from set M.

Hyperparameters 12a are now optimized according to step 250 in such a way that after AI module 1 is newly formed 220 and subsequently trained 230, summary statistics 18 of the vulnerabilities show an overall lesser vulnerability of AI modules 1 to spoofing attempts. Thus, candidate AI modules are checked for vulnerability in succession, using method 100.

In the example shown in FIG. 3, hyperparameters 12a are optimized by generating new architectures of internal processing chain 12 of AI module 1 to be formed, in each case according to block 251, using an evolutionary algorithm. Summary statistics 18 in each case are then entered into a quality criterion (fitness function) for the particular architecture according to block 252.

Figure 4:
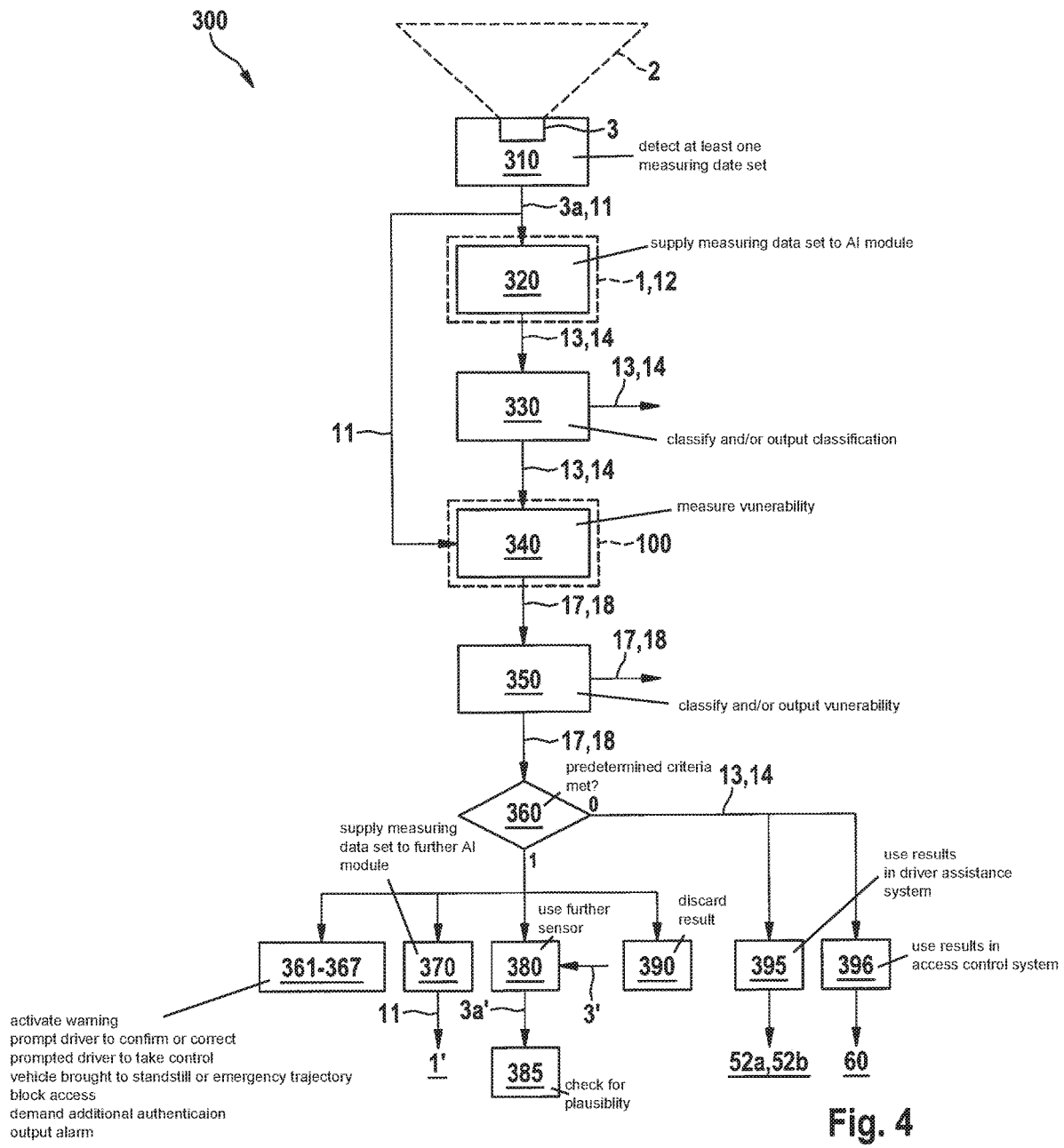
FIG. 4 shows one exemplary embodiment of method 300 for monitoring a detection range 2.

FIG. 4 shows one exemplary embodiment of method 300 for monitoring a detection range 2. At least one measuring data set 11 containing measuring data 3a is detected via a sensor 3 in step 310. This measuring data set is supplied to AI module 1 in step 320. With its internal processing chain 12, AI module 1 generates a classification 13 and/or a regression 14 from measuring data set 11. This classification 13 and/or regression 14 is classified and/or output as result 13, 14 of the monitoring in step 330.

Vulnerability 17, 18 of AI module 1 to spoofing attempts is measured in step 340, using method 100. This vulnerability 17, 18 is classified and/or output as a measure for the reliability of result 13, 14 in step 350.

In addition, FIG. 4 illustrates even further various countermeasures that may be taken, individually or in combination, in response to a determination in step 360 that ascertained vulnerability 17, 18 satisfies a predefined criterion (truth value 1).

Thus, for example, when method 300 is applied in a vehicle 50 in which results 13, 14 are supplied to a driving assistance system 52a or a system 52b for at least partially automated driving (not illustrated in FIG. 4),
- a physical warning device that is noticeable to the driver of the vehicle is activated according to block 361,
- the driver of vehicle 50 is prompted to confirm or correct result 13, 14 according to block 362,
- the driver of vehicle 50 is prompted to take control of vehicle 50 according to block 363, and/or
- vehicle 50 is brought to a standstill on an emergency trajectory that is provided in the event of failure of the at least partially automated driving function, according to block 364.

In addition, for example when method 300 is applied in an access control system 60 for controlling the access to a space 61, a site 62, and/or an information technology system 63 that checks the presence of a valid access medium in detection range 2, based on results 13, 14,
- the access is blocked for a predetermined period, independently of the presence of a valid access medium 65, according to block 365,
- additional authentication is demanded from the person requesting access, according to block 366, and/or
- an alarm is output to an authority responsible for the security of space 61, site 62, or information technology system 63, according to block 367.

In general, for example
- measuring data set 11 may be supplied to a further AI module 1' that is trained differently and/or has a different architecture, according to block 370, and/or
- according to block 380, a further sensor 3' for obtaining additional measuring data 3a' may be used to check result 13, 14 for plausibility according to block 385, and/or
- result 13, 14 may be discarded according to block 390.

In contrast, if vulnerability 17, 18 is not noticeably great (truth value 0 for the check in step 360), results 13, 14 may be utilized, for example, in driving assistance system 52a or in system 52b for at least partially automated driving, according to block 395. However, results 13, 14 may also be utilized, for example, in access control system 60 according to block 396.

Figure 5:
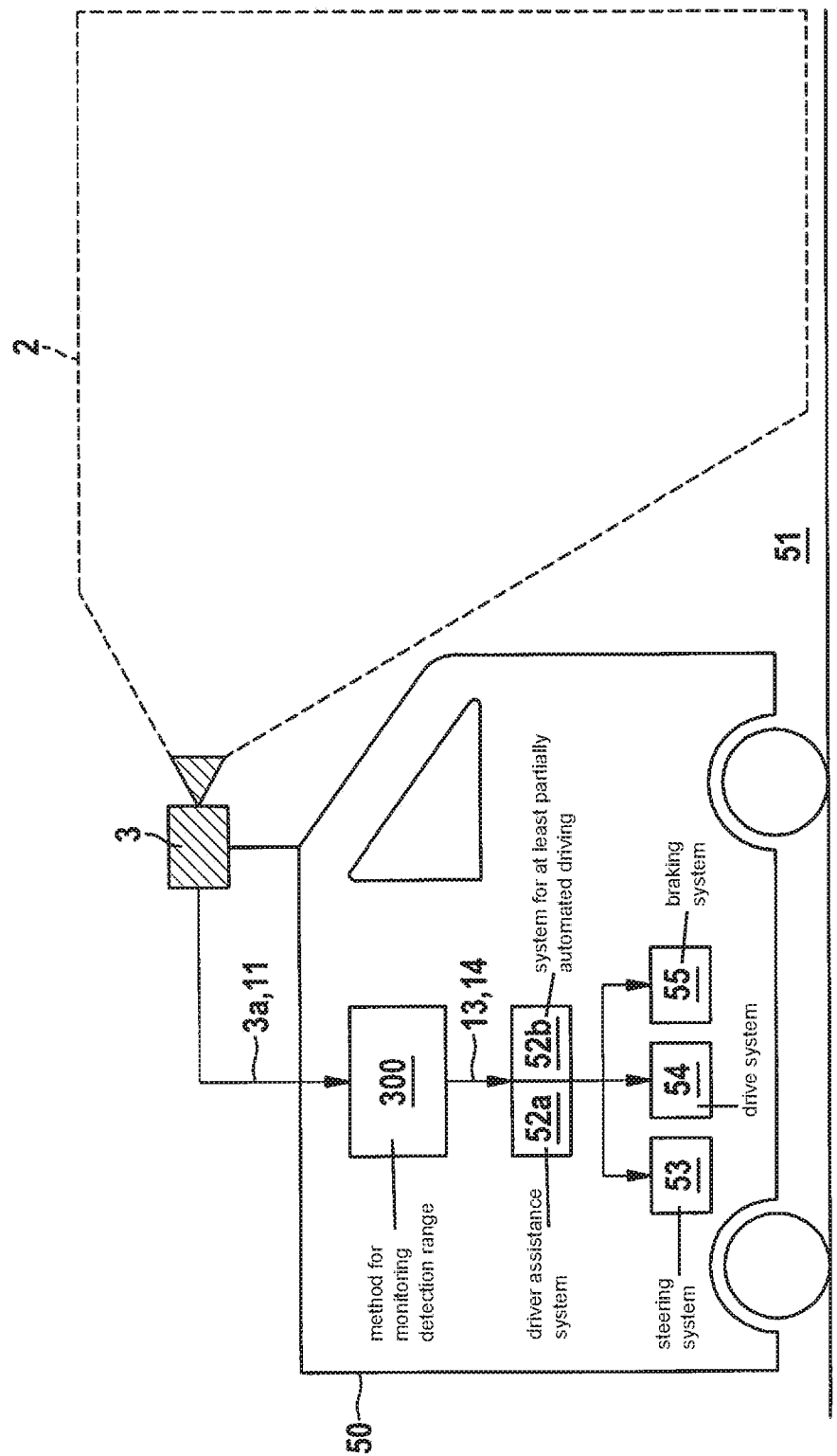
FIG. 5 shows a schematic illustration of an example of an application of method 300 in a vehicle 50.

The application of method 300 in vehicle 50 is briefly outlined once again in FIG. 5. In this case, detection range 2 is part of surroundings 51 of vehicle 50. Driving assistance system 52a and/or system 52b for at least partially automated driving engage(s) with the dynamics of the vehicle, based on results 13, 14 derived from measuring data sets 11 using method 300, by actuating a steering system 53, a drive system 54, and/or a braking system 55 of vehicle 50.

The application of method 300 in access control system 60 is briefly outlined once again in FIG. 6. Access control system 60 checks whether a valid access medium 65 for access to space 61, site 62, or IT system 63 is provided in detection range 2.

In the example shown in FIG. 6, access medium 65 is a hand having certain biometric features. Based on results 13, 14 derived from measuring data sets 11 using method 300, access control system 60 actuates a blocking device and/or alarm device 64 to grant or deny access.

What is claimed is:

1. A method of operation of a vehicle, the method comprising:
   a sensor of the vehicle sensing a detection region of an environment in which the vehicle is located, based on which the sensor produces an input data set of an input space E having a dimensionality D;
   a processor of the vehicle executing an AI module on the input data set produced by the sensor, wherein the AI module includes trainable artificial intelligence in the form of a parameterized internal processing chain and the executing of the AI module causes the AI module to produce an unperturbed result by mapping, using the internal processing chain, an unperturbed version of the input data set of the input space E having the dimensionality D onto a classification and/or regression in an output space F having a dimensionality $G<D$;
   the processor ascertaining a degree of vulnerability of the AI module with respect to the input data set produced by the sensor by:

applying at least one perturbation each having a respective dimensionality d<D to the input data set produced by the sensor so that at least one perturbed data set results in the input space E;

executing the AI module to ascertain a classification and/or regression onto which the AI module maps the perturbed data set as a perturbed result;

ascertaining a deviation of the perturbed result from the unperturbed result using predefined metrics; and in response to the deviation satisfying a predefined criterion, determining that the AI module with regard to the input data set produced by the sensor is not vulnerable to spoofing attempts having the respective dimensionality d; and in response to the determination, the vehicle performing an autonomous drive operation of the vehicle based on the unperturbed result produced by the execution of the AI module.

2. The method as recited in claim 1, wherein an adversarial example for the AI module having the respective dimensionality d is ascertained as the perturbation.

3. The method as recited in claim 1, wherein the at least one perturbation includes multiple perturbations whose respective dimensionalities d differ from one another, and a smallest dimensionality c=min(d) for which a vulnerability of the AI module to spoofing attempts is determined is classified as a measure for the vulnerability of the AI module with regard to the data set produced by the sensor.

4. The method as recited in claim 1, further comprising performing the ascertainment of the degree of vulnerability of the AI module with regard to each of one or more other data sets so that respective degrees of vulnerability are ascertained for the input set produced by the sensor and the one or more other data sets, and ascertaining summary statistics of the respective ascertained degrees of vulnerability.

5. The method as recited in claim 4, wherein the summary statistics contain an average value and/or a variance and/or a frequency distribution and/or a worst case value of the ascertained vulnerabilities.

6. The method as recited in claim 1, wherein the autonomous drive operation the vehicle includes a steering of the vehicle, and/or a propulsion of the vehicle, and/or a braking of the vehicle.

7. A method for producing an AI module that includes trainable artificial intelligence in the form of a parameterized internal processing chain and is configured to map, using the internal processing chain, input data sets from an input space E having a dimensionality D onto a classification and/or regression in an output space F having a dimensionality G<D, the method comprising the following steps:

establishing an architecture of the internal processing chain using hyperparameters;

forming an AI module which includes the internal processing chain;

training the AI module by optimizing parameters of the internal processing chain, based on a set L of learning data sets and associated learning results, in such a way that the AI module with a predefined accuracy maps the learning data sets onto the learning results according to an error function;

for each of a plurality of validation data sets:
ascertaining a classification and/or a regression onto which the AI module maps the validation set as an unperturbed result for the validation data set in the input space E;

applying at least one perturbation that each has a respective dimensionality d<D to the validation set so that at least one perturbed data set results in the input space E;

ascertaining a classification and/or regression onto which the AI module maps the perturbed data set as a perturbed result;

ascertaining a deviation of the perturbed result from the unperturbed result using predefined metrics; and in response to the deviation satisfying a predefined criterion, determining that the AI module with regard to the validation data set has a respective vulnerability of being vulnerable to spoofing attempts having one of the respective dimensionalities d;

ascertaining summary statistics based on the ascertained vulnerabilities; and optimizing the hyperparameters in such a way that after the AI module is newly formed and trained, the ascertained summary statistics indicate an overall lesser vulnerability to spoofing attempts.

8. The method as recited in claim 7, wherein the hyperparameters are optimized by generating architectures of the internal processing chain, using an evolutionary algorithm, the summary statistics of the vulnerabilities, ascertained in each case after the AI module is formed and trained, using one of the architectures, being entered into a quality criterion for assessing this architecture.

9. The method as recited in claim 1, wherein the input data set produced by the sensor contains at least one measured value of a physical measured variable.

10. The method as recited in claim 7, wherein at least one of the learning data sets contains at least one measured value of a physical measured variable.

11. A monitoring method of a machine that includes a sensor and a processor, the method comprising:

the sensor performing a physical detection, thereby producing at least one measuring data set with measuring data, the detection being of a detection range;

the processor of the machine:
executing an AI module on the data set produced by the sensor, wherein the AI module:
includes trainable artificial intelligence in the form of a parameterized internal processing chain; and
with the aid of the internal processing chain, is configured to map input data sets from an input space E having a dimensionality D onto a classification and/or regression in an output space F having a dimensionality G<D;

classifying the classification and/or the regression output by the AI module as a result of the monitoring;

measuring vulnerability of the AI module to spoofing attempts by:
ascertaining a classification and/or a regression onto which the AI module maps the measuring data set as an unperturbed result for the measuring data set in the input space E;

applying at least one perturbation each having a respective dimensionality d<D to the measuring data set produced by the sensor so that at least one perturbed data set results in the input space E;

ascertaining a classification and/or regression onto which the AI module maps the perturbed data set as a perturbed result;

ascertaining a deviation of the perturbed result from the unperturbed result using predefined metrics; and in response to the deviation satisfying a predefined criterion, determining that the AI module with regard to the measuring data set produced by the sensor is vulnerable to spoofing attempts having the respective dimensionality d; and classifying and/or outputting the ascertained vulnerability as a measure for the reliability of the result of the monitoring.

12. A method of operation of a machine, the method comprising:

a sensor of the machine measuring a physical feature, based on which the sensor produces an input data set of an input space E having dimensionality D;

a processor of the machine executing an AI module on the input data set produced by the sensor, wherein the AI module includes trainable artificial intelligence in the form of a parameterized internal processing chain and the executing of the AI module causes the AI module to produce an unperturbed result by using internal processing chain to map an unperturbed version of the input data set of the input space E having the dimensionality D onto a classification and/or regression in an output space F having a dimensionality G<D;

the processor ascertaining a degree of vulnerability of the AI module with respect to the input data set produced by the sensor by:

applying at least one perturbation each having a respective dimensionality d<D to the input data set produced by the sensor so that at least one perturbed data set results in the input space E;

executing the AI module to ascertain a classification and/or regression onto which the AI module maps the perturbed data set as a perturbed result;

ascertaining a deviation of the perturbed result from the unperturbed result using predefined metrics; and in response to the deviation satisfying a predefined criterion, determining that the AI module with regard to the input data set produced by the sensor is vulnerable to spoofing attempts having the respective dimensionality d; and in response to the determination, the machine entering a state by which the machine is not manipulatable by a user and/or locking a space from being physically accessed by the user.

13. The method as recited in claim 12, wherein in response to the determined vulnerability satisfying a predefined criterion: (i) the measuring data set is supplied to a further AI module, the further AI module having a different architecture than the previously used AI module, and/or the further AI module having been trained differently than the previously used AI module; and/or (ii) additional measuring data are detected using a further physical sensor, and the additional measuring data are used to check the unperturbed result for plausibility; and/or (iii) the unperturbed result of the monitoring is discarded.

14. The method as recited in claim 12, wherein the physical feature is measured by the sensor detecting an area by which presence of a valid access medium in the detection range is determined, and, in response to the determination that the AI module, with regard to the input data set produced by the sensor, is vulnerable to the spoofing attempts having the respective dimensionality d, the machine locks the space.

15. The method as recited in claim 14, wherein the physical feature is biometric measuring data of a person requesting access.

16. A non-transitory machine-readable memory medium on which is stored a computer program including machine-readable instructions that are executable by a processor of a vehicle and that, when executed by the processor, causes the processor to perform a method, the method comprising:

obtaining from a sensor of the vehicle an input data set of an input space E having a dimensionality D, which the sensor produces based on the sensor sensing a detection region of an environment in which the vehicle is located;

executing an AI module on the input data set produced by the sensor, wherein the AI module includes trainable artificial intelligence in the form of a parameterized internal processing chain and the executing of the AI module causes the AI module to produce an unperturbed result by mapping, using the internal processing chain, an unperturbed version of the input data set s from an of the input space E having the dimensionality D onto a classification and/or regression in an output space F having a dimensionality G<D;

ascertaining a degree of vulnerability of the AI module with respect to the input data set produced by the sensor by:

applying at least one perturbation each having a respective dimensionality d<D to the input data set produced by the sensor so that at least one perturbed data set results in the input space E;

executing the AI module to ascertain a classification and/or regression onto which the AI module maps the perturbed data set as a perturbed result;

ascertaining a deviation of the perturbed result from the unperturbed result using predefined metrics; and in response to the deviation satisfying a predefined criterion, determining that the AI module with regard to the input data set produced by the sensor is not vulnerable to spoofing attempts having the respective dimensionality d; and in response to the determination, the vehicle performing an autonomous drive operation of the vehicle based on the unperturbed result produced by the execution of the AI module.

* * * * *